7/6/76 OR T,948,009 file according to DATE

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 7

T948,009

HYDRAULIC CEMENT-HYDROXYPROPYL METHYLCELLULOSE COMPOSITIONS

George K. Greminger, Jr., and Geoffrey S. Newhouse, Midland, Mich., assignors to The Dow Chemical Company, Midland, Mich.

Continuation-in-part of abandoned application Ser. No. 366,899, June 4, 1973. This application Mar. 26, 1975, Ser. No. 562,312

Int. Cl. C04b *7/353*

U.S. Cl. 106—93

No Drawing. 20 Pages of Specification

An intimate mixture of (a) a hydraulic cement; (b) about 0.01% to about 5.0%, based on the dry weight of the cement, of a hydroxypropyl methylcellulose having about 0.4 to about 1.3 methoxyl degree of substitution and about 0.4 to about 1.8 hydroxypropyl degree of molar substitution; and optionally (c) a filler material such as sand, limestone, asbestos fibers, concrete aggregate and the like provides an improved cementitious material for preparation of masonry and tile mortars, stucco, concrete, etc. Cement products prepared from this material have improved water-retention properties especially at elevated temperatures without unduly extended set times.